Nov. 22, 1949     A. E. DENTLER ET AL     2,488,619
APPARATUS FOR TESTING DRAFT GEARS
Filed Jan. 11, 1947     3 Sheets-Sheet 1
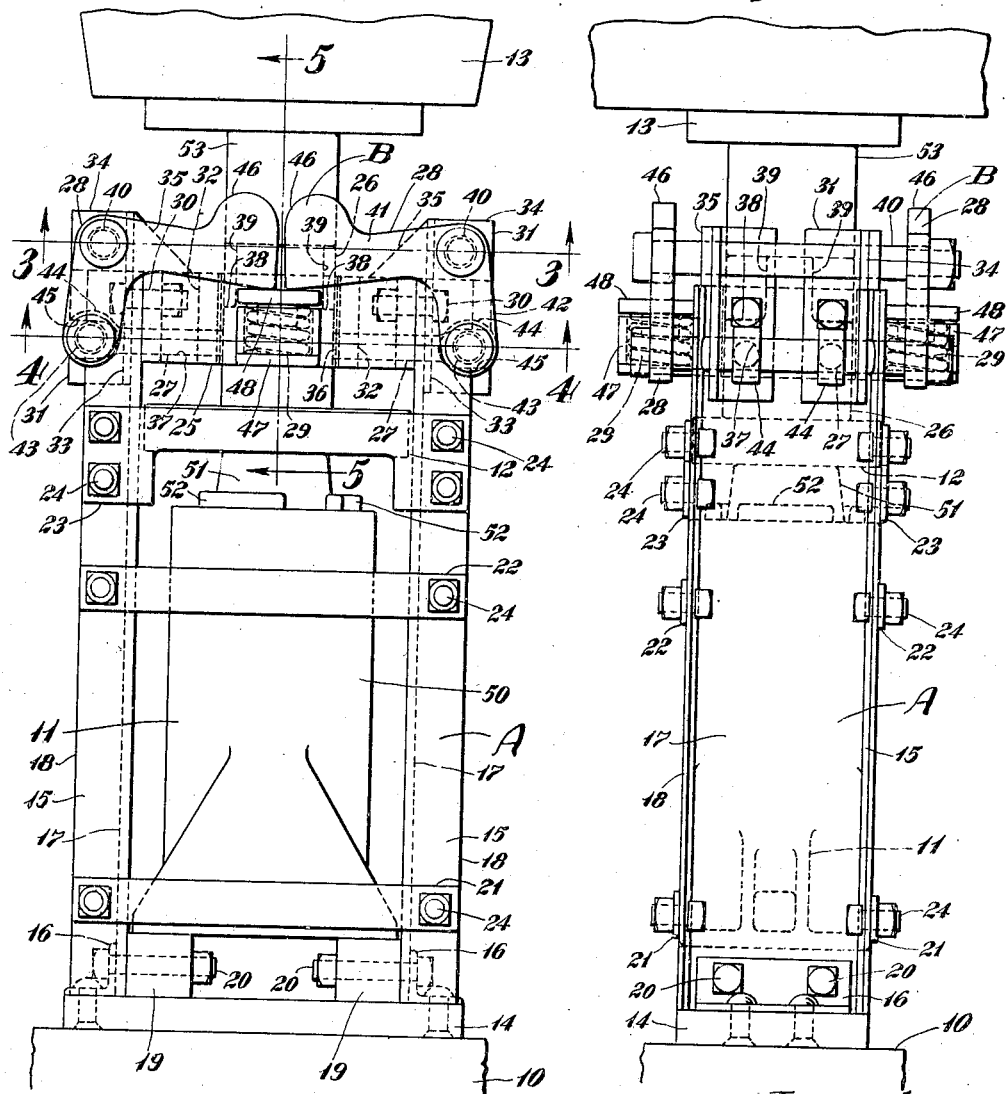
Inventors
Arnold E. Dentler
George E. Dath
By Henry Fuchs, Atty.

Nov. 22, 1949     A. E. DENTLER ET AL     2,488,619
APPARATUS FOR TESTING DRAFT GEARS
Filed Jan. 11, 1947     3 Sheets-Sheet 2

Inventors
Arnold E. Dentler
George E. Dath
By Henry Fuchs
Atty.

Nov. 22, 1949     A. E. DENTLER ET AL     2,488,619
APPARATUS FOR TESTING DRAFT GEARS
Filed Jan. 11, 1947     3 Sheets-Sheet 3
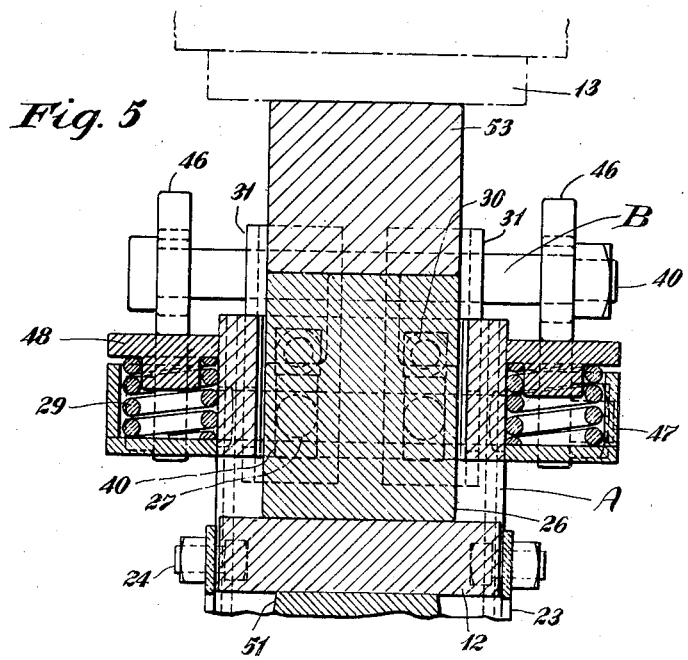
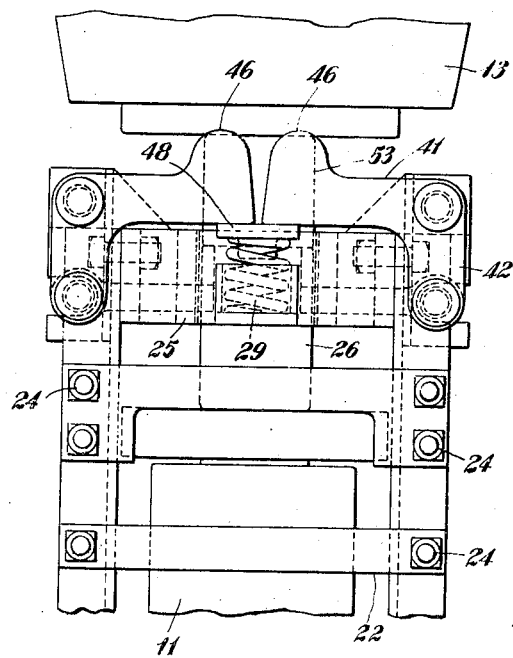
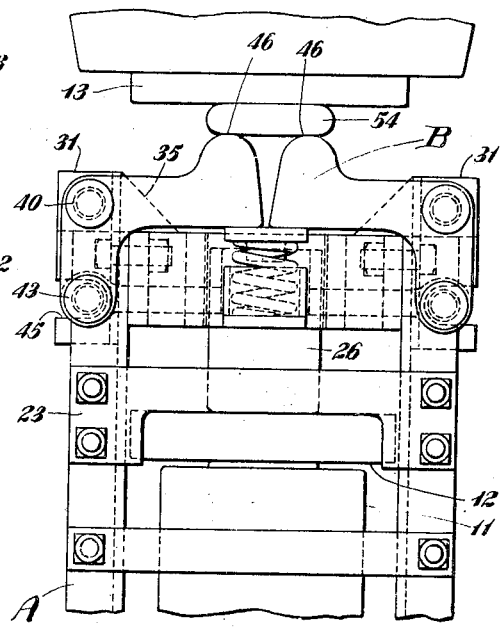
Inventors
Arnold E. Dentler
George E. Dath
By Henry Fuchs
Atty.

Patented Nov. 22, 1949

2,488,619

UNITED STATES PATENT OFFICE 2,488,619

APPARATUS FOR TESTING DRAFT GEARS

Arnold E. Dentler, La Grange, and George E. Dath, Mokena, Ill., assignors to W. H. Miner, Inc., Chicago, Ill., a corporation of Delaware Application January 11, 1947, Serial No. 721,626

6 Claims. (Cl. 73—11)

1

This invention relates to apparatus for testing the retaining means of railway draft gears.

In testing draft gears of railway cars, it is common practice to use a hammer which is elevated to different heights and dropped upon a draft gear supported on a suitable anvil so as to be struck by the hammer when it descends. In following this procedure, reasonably accurate data is obtainable as to the performance, sturdiness, and endurance of the draft gear itself when subjected to compression forces. Inasmuch as the weight of the hammer impedes the recoil action of the draft gear in following this testing procedure, no information is obtainable thereby as to the effect of the recoil action on the retaining means of the draft gear in service. To determine the strength and ruggedness of such retaining means, it is the practice to employ the standard static tests, but the results obtained thereby cannot be related to service where sudden release delivers a heavy recoil shock load to the retaining means.

The main object of this invention is to provide an apparatus whereby the testing of the retaining means of railway draft gears by recoil action of the gears is readily accomplished, thereby producing results which are comparable to those encountered in actual service and from which accurate information as to the efficiency and ruggedness of the retaining means may be directly obtained.

Another object of the invention is to provide an apparatus in the form of a test frame designed for use in connection with the usual drop hammer for testing the retaining means of draft gears, comprising releasable locking means for holding the draft gear being tested in closed or partly closed position, and means operated by lowering of the hammer for effecting instantaneous release of the gear by unlocking said locking means, thus subjecting the retaining means to shocks corresponding to those encountered in actual service.

Other objects of the invention will more clearly appear from the description and claims hereinafter following.

Figure 3:
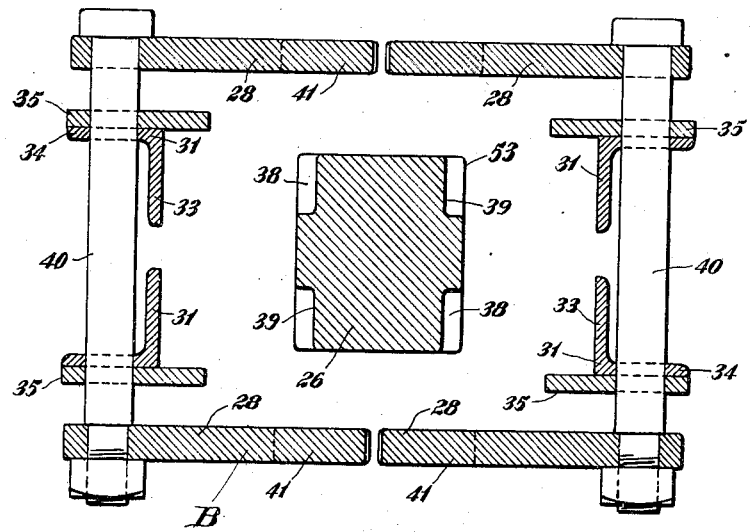
Figure 4:
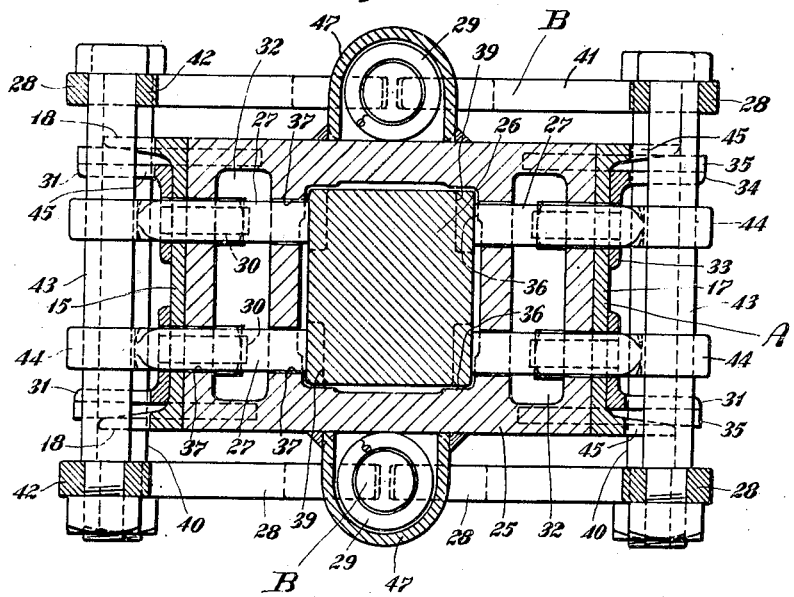

In the accompanying drawings forming a part of this specification, Figure 1 is a fragmentary, front elevational view of a drop hammer such as used in testing railway draft gears, and showing our improved test frame apparatus in connection therewith. Figure 2 is a side elevational view of Figure 1, looking toward the left in said figure. Figures 3 and 4 are horizontal sectional views, corresponding substantially to the lines 3—3 and 4—4 of Figure 1. Figure 5 is a vertical

2 sectional view, corresponding substantially to the line 5—5 of Figure 1. Figure 6 is a view similar to Figure 1, broken away, showing the hammer in the position it occupies when dropped on the draft gear, fully closing the latter and showing the trigger means of the test frame in locking position. Figure 7 is a view, similar to Figure 6, showing the hammer being lowered to release the trigger means.

As shown in the drawings, 10 indicates the anvil of a drop hammer upon which is supported our improved testing frame A. The draft gear 11 to be tested is contained within the frame A. A follower plate 12 is superimposed on the gear 11. The follower plate 12 corresponds in size and characteristics to the standard front follower plate employed in connection with railway draft riggings. The usual weight or tup 13 of the drop hammer is mounted between upright guide members, not shown, forming the side sections of the framework of the drop hammer, between which the weight or tup is guided and drops freely. As will be understood, the tup is lifted by any suitable hoisting mechanism and dropped as desired.

The frame A includes a base member in the form of a relatively heavy, substantially rectangular plate 14 having upright channel members 15—15 rigidly secured thereto at opposite sides thereof through the medium of reenforcing angle plates 16—16, the latter being fixedly secured to the base plate 14 by any suitable means, preferably rivets. Each upright channel member 15 comprises a relatively wide, platelike section or web 17 having outwardly projecting flanges 18—18 at opposite vertical side edges thereof. A pair of anvil blocks 19—19 are supported directly on the base plate 14 and are secured to the inner sides of the channel members 15—15 by bolts 20—20, which extend through the blocks 19—19, the channel members 15—15, and the vertical flanges of the corresponding angle plates 16—16. The channel members 15—15 are spaced apart a distance corresponding substantially to the standard spacing between the usual channel-shaped center sills of a railway car underframe, and the blocks 19—19 correspond to the usual rear stop lugs of the center sills. The channel members 15—15 are rigidly united by front and rear tie bars 21—21 and 22—22 and front and rear tie plates 23—23, the tie plates 23—23 being located near the upper ends of the channel members, the tie bars 21—21 adjacent the lower ends of said channel members, and the tie bars 22—22 between the plates 23—23 and the bars 21—21. The opposite ends of the front and rear tie bars 21—21 and 22—22 and the opposite ends of the front and rear tie plates 23—23 are secured to the flanges 18—18 of the channel members 15—15 by any suitable means, preferably by bolts 24. The tie bars 21—21 and 22—22 and the rear tie plates 23—23 are thus removably mounted. The removable mounting of the tie bars and plates is necessary at least at one side of the frame in order to provide access to the test frame for insertion and removal of the draft gear 11 and the follower 12.

In carrying out our invention, the test frame A is provided with a releasable trigger mechanism B at the top thereof, comprising a combined supporting and guide casting 25, a pressure transmitting block 26 guided for vertical movement in the casting 25, sliding locking pins 27 cooperating with the block 26, bell crank levers 28 for advancing and retracting the pins 27, and springs 29 cooperating with the bell crank levers for yieldingly holding the pins in locking engagement with the pressure transmitting block.

The combined supporting and guide casting 25 is in the form of a heavy block mounted between the channel members 15—15 of the test frame A, directly above the tie plates 23—23. This casting is rigidly secured to the channel members 15—15 by bolts 30—30 extending through the webs 17—17 of the channel members 15—15, and vertically extending angle bars 31—31 at opposite sides of the channel members, and seated in the casting 25, the casting 25 being provided at opposite sides with core openings 32—32 which extend vertically therethrough and accommodate the nuts of the bolts. In order to rigidify the structure, the casting 25 is preferably further secured to the channel members by being welded thereto. The angle bars 31—31, which are four in number, are arranged in pairs at opposite sides of the frame A, the bars of each pair extending vertically and being secured to the outer side of the web 17 of the corresponding channel member 15 at opposite sides of the latter, adjacent to and interiorly of the respective flanges 18—18, the base flanges of the bars 31—31, which base flanges are indicated by 33—33, being preferably welded to the web 17 of said channel member.

As shown in Figures 1, 2, 6, and 7, the casting 25 has its upper side flush with the upper ends of the channel members 15—15, and the bars 31—31 and 31—31 extend upwardly beyond the upper ends of the channel members above the level of the upper side of the casting 25. The angle bars 31 have the flanges 34 thereof, which extend from the base flanges 33, disposed at right angles to the planes of the web 17 of the corresponding channel member 15. Reenforcing gusset plates 35—35 and 35—35 are employed to rigidly connect the upper end portions of the angle bars 31—31 and 31—31 to the casting 25, each gusset plate having flat abutment with and being welded to the outer side of the flange 34 of the corresponding bar 31, and having its lower edge engaged over and welded to the upper side of the casting 25 at the corresponding side of the testing frame.

The casting 25 has a vertically extending, central guide opening or way 36 which is of rectangular, transverse section for guiding the block 26, which is vertically movable in said guideway.

The locking pins 27 are four in number and are arranged in pairs at opposite sides of the mechanism, the pins 27—27 of each pair being guided for movement in a horizontal path in suitable, horizontally extending guide openings or bores 37—37, provided in the casting 25, channel members 15, and angle bars 31. The inner ends of the pins 27 are engageable in locking seats 38 provided at opposite sides of the block 26, which seats register with the guide openings 37 of the block. The seats 38—38 and 38—38 are provided by the lower end walls of vertically extending channels 39—39 and 39—39 formed by cut away portions at the four corners of the block 26.

The bell crank levers 28, by which the pins 27 are advanced and retracted, are four in number, being arranged in pairs at opposite sides of the mechanism at the front and rear sides of the frame A, outwardly of the channel members frame 15—15. The bell crank levers 28—28 of each pair are supported for swinging movement on a pivot shaft or bolt 40 extending through said bell cranks and the upper end portions of the flanges 34—34 of the angle bars 31—31, and the gusset plates 35—35 at the corresponding side of the frame A. Each bell crank lever 28 has an elongated, inwardly extending, horizontally disposed, relatively long arm 41 and a depending short arm 42. The short arms 42—42 of each pair of bell crank levers are connected to the outer ends of the corresponding pins 27—27 by a pivot bolt 43 extending through suitable bearing openings in the lower ends of said arms and eye members 44—44 formed at the outer ends of the pins, the flanges 18—18 of the corresponding channel member 15 and the flanges 34—34 of the angle bars 31—31, being suitably recessed, or cut out, as indicated at 45, to accommodate the bolt 43 in its required swinging movement. The long arms 41—41 and 41—41 of the two pairs of bell crank levers 28—28 and 28—28 extend inwardly toward each other and have rounded, upstanding heads 46—46 and 46—46 at their inner ends, which are adapted to receive the weight of the tup 13 of the drop hammer when lowered.

The springs 29—29, which cooperate with the bell crank levers 28—28 and 28—28 to yieldingly hold the pins 27—27 and 27—27 engaged in the seats of the block 26, are arranged in spring seats 47—47 at the front and rear sides of the casting 25. Each spring seat 47 is in the form of a housing welded to the corresponding side of the casting 25. The spring seats 47—47 are open at the top and closed at the bottom and the springs 29—29 are in the form of short, helical coils mounted in said seats. A spring follower plate 48 is associated with each spring 29 and is interposed between the same and the lower sides of the arms 41—41 of the two bell crank levers 28—28 at the corresponding side of the mechanism, that is, the spring follower 48 of the spring 29 at the front side of the test frame engages the outer ends of the arms 41—41 of the bell crank levers 28—28 at the front side of the frame, and the spring follower 48 of the spring 29 at the rear side of the test frame engages the outer ends of the arms 41—41 of the bell crank levers 28—28 at the rear side of the frame. The springs 29—29 are normally under compression, thus urging the arms 41 of the bell crank levers 28 to swing upwardly and the arms 42 to swing inwardly to maintain the pins 27 engaged within the seats 38 of the pressure transmitting block 26 to lock the latter against upward movement. The spring pressed bell crank levers 28 and locking pins 27 constitute a trigger mechanism which is operative to instantly release the block 26 by retracting the pins 27 through the action of the bell crank levers when the arms 41 of the latter are forcibly swung downwardly against the resistance of the springs 29 by pressure applied to the heads 46 of said levers.

Our improved test frame apparatus, as shown in the drawings and hereinbefore described, is particularly designed for testing the retaining means of railway draft gears, that is, for testing the means for limiting expansion of such gears and maintaining the same of uniform overall length. Draft gears most commonly used in railway draft riggings are of the friction type, and the gear 11, indicated in the drawings, is of this character. As is well known to those skilled in the railway draft rigging art, such friction draft gears usually comprise a friction casing, a spring resisted friction clutch including a pressure transmitting wedge and cooperating friction shoes slidingly telescoped within the casing, and retaining means for limiting outward movement of the clutch. One form of retaining means commonly employed is a bolt anchored to the casing and having shouldered engagement with the wedge to limit outward movement of the latter with respect to the casing. Another form of retaining means employed comprises lugs or stop shoulders on the wedge block engaging in back of cooperating stop lugs or flanges on the casing. The gear 11 represented in the drawings is of the latter type, the friction casing of the gear being indicated by 50, the wedge block of the friction clutch by 51, and the shoes of the clutch by 52. The usual spring, not shown, as is well known, is contained within the casing 50 and yieldingly opposes inward movement of the clutch, and the retaining means, not shown, which is also well known, comprises radial lugs on the wedge block 51, engageable with inturned stop lugs or flanges at the top end of the casing. The gear 11 shown in the drawing is further of that type having an integral rear follower, which follower rests on the anvil blocks 19—19 when the gear is in the test frame. However, as will be obvious to those skilled in this art, in testing gears not having integral rear followers, the gear is placed on the usual rear follower plate, which is supported on the anvil block 19.

In testing the retaining means of draft gears with our improved apparatus, the procedure is as follows: The draft gear 11 is placed within the test frame in upright position on the anvil blocks 19—19 with the follower plate 12 resting on the wedge block 51, the test frame being positioned on the anvil 10 of the drop hammer so that the wedge block of the gear is in vertical alignment with the weight or tup of the hammer. After the gear has been placed in position, the pressure transmitting block 26 is lowered in resting position onto the follower plate 12 and a spacing plunger 53 placed on top of the block 26, as shown in Figures 1 and 2. During this time, the weight or tup 13 of the drop hammer is in the raised position indicated in dotted lines in Figure 1. The weight or tup 13 is then dropped to close the gear 11, the impact of the weight transmitted through the plunger 53, block 26, and the follower 12 compressing the gear, as shown in Figure 6. As the block 26 is being forced downwardly, the seats or shoulders 38 of the same pass the locking pins 27 and the latter snap over the shoulders to lock the block 26 against upward movement and hold the gear compressed, as illustrated in Figure 6. The tup or weight 13 is then lifted from the gear to its normal position shown in dotted lines in Figure 1. The spacing block 53 is then removed and an elongated bar or beam 54 is placed on top of the heads 46—46 and 46—46 of the arms 41—41 and 41—41 of the bell crank levers 28—28 and 28—28, the bar or beam 54 spanning the space between the front and rear sets of bell crank levers and lying in the path of dropping movement of the tup 13. The weight or tup 13 is then lowered onto the beam 54, to depress the latter. The motion transmitted to the bell crank levers by the beam 54, releases the trigger means by withdrawing the locking pins 27 from the seats 38 of the block 26, thus instantaneously releasing the gear 11 to permit free recoil thereof until arrested by the retaining means of said gear. This procedure is repeated the desired number of times to obtain the information sought.

Although it is of great importance to obtain information as to the performance of the retaining means under conditions wherein the same is exposed to the maximum recoil intensity of the draft gear in release, as produced by a gear subjected to full compression as hereinbefore described, it is also desirable to obtain data as to the performance thereof under recoil conditions produced when the gear has been subjected to less than full compression. This may be readily accomplished in the manner hereinbefore described by merely providing pressure transmitting blocks having the locking seats thereof variously spaced and selecting a pressure transmitting block having the locking seats positioned so as to permit locking of the draft gear by the trigger means in the desired state of partly compressed condition.

We claim:

1. In an apparatus for testing draft gears, the combination with a frame having abutment means thereon for receiving the draft gear; of a guide member fixed to said frame remote from said abutment means; a movable impact operative plunger slidingly supported by said guide member for movement toward and away from said abutment means; locking pins carried by said guide member, said pins being engageable with said plunger for locking the same against return movement with respect to the abutment means; and lever means for advancing and retracting said pins.

2. In an apparatus for testing draft gears, the combination with a frame having abutment means thereon for receiving the draft gear; of a guide member fixed to said frame remote from said abutment means; a movable impact operative plunger slidingly supported in said guide member for movement toward and away from said abutment means; locking pins carried by said guide member, said pins being engageable with said plunger for locking the same against return movement with respect to the abutment means; lever means for advancing and retracting said pins; and spring means yieldingly holding said lever means in position with the pins interlocked with said plunger.

3. In an apparatus for testing draft gears, the combination with a frame having abutment means thereon for receiving the draft gear; of a guide member fixed to said frame remote from said abutment means; a movable impact operative plunger slidingly supported by said guide member for movement toward and away from said abutment means; locking pins carried by said guide member, said pins being engageable with said plunger for locking the same against return movement with respect to the abutment means; bell crank levers for advancing and retracting said locking pins; and spring means yieldingly holding the bell crank levers is position with the pins interlocked with said plunger.

4. In an apparatus for testing draft gears, the combination with a frame having abutment means thereon for receiving the draft gear; of a guide member fixed to said frame remote from said abutment means; a movable impact operative plunger slidingly supported by said guide member for movement toward and away from said abutment means; locking pins carried by said guide member, said pins being engageable with said plunger for locking the same against return movement with respect to the abutment means; bell crank levers for advancing and retracting said pins, each lever having an arm connected with the corresponding pin and a second arm at right angles to said first named arm; and spring means engaged with said second named arm to move the same in one direction to rock the bell crank lever and bring the corresponding pin into locking engagement with the plunger, said second named arm being movable in a reverse direction against the resistance of said spring to rock the bell crank lever to disengage the pin from said plunger.

5. In an apparatus for testing the retaining means of draft gears, the combination with an anvil for receiving the gear in supported relation thereon; of a weight above said anvil adapted to be lowered toward the same; a fixed guide block above said anvil and below said weight; an impact operative plunger guided in said block for vertical movement toward and away from said anvil, said plunger being engageable with said gear; a spring resisted trigger means for locking said plunger against return movement in predetermined position with respect to said anvil, said plunger being in the path of dropping movement of said weight to be actuated thereby to compress said gear; and means adapted to be engaged by said trigger means and interposed in the path of lowering movement of the weight for actuating said trigger means by downward movement of the weight to release said trigger means and unlock the plunger for free movement.

6. In an apparatus for testing the retaining means of draft gears, the combination with a drop hammer including a drop weight and an anvil for receiving and supporting the gear to be tested; of a test frame within which said gear is enclosed, said test frame having a fixed guide block at the upper end; an impact operative plunger vertically slidable in said block, said plunger being in vertical alignment with said weight and gear; bell crank levers swingingly supported at opposite sides of said guide block beyond the path of movement of said weight; locking pins actuated by said bell crank levers and engageable with said plunger to lock the same against return movement; springs for forcing said levers in one direction to engage said pins with the plunger to lock the same; and a member adapted to be interposed in the path of downward movement of the weight of said hammer and engage said levers for transmitting movement from said weight to said levers for rocking the same in direction to withdraw said pins from locking engagement with the plunger.

ARNOLD E. DENTLER.
GEORGE E. DATH.

REFERENCES CITED

The following references are of record in the file of this patent:

UNITED STATES PATENTS

| Number | Name | Date |
| --- | --- | --- |
| 1,262,083 | O'Conner | Apr. 9, 1918 |
| 1,829,128 | Dentler | Oct. 27, 1931 |
| 2,325,027 | Anway | July 27, 1943 |